United States Patent
Ramanathan et al.

(10) Patent No.: US 12,105,853 B1
(45) Date of Patent: Oct. 1, 2024

(54) SYSTEMS AND METHODS FOR PROVIDING ELECTRONIC INFRASTRUCTURE ON PAPER DOCUMENTS

(71) Applicant: Wells Fargo Bank, N.A., San Francisco, CA (US)

(72) Inventors: Ramanathan Ramanathan, San Francisco, CA (US); Sridhar Nagendra Chunduri, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/993,568

(22) Filed: Nov. 23, 2022

Related U.S. Application Data

(63) Continuation of application No. 17/070,322, filed on Oct. 14, 2020, now Pat. No. 11,531,740, which is a continuation of application No. 15/972,529, filed on May 7, 2018, now Pat. No. 10,839,057.

(51) Int. Cl.
| | |
|---|---|
| *G06F 21/00* | (2013.01) |
| *G06F 21/32* | (2013.01) |
| *G06F 21/60* | (2013.01) |
| *G06F 21/64* | (2013.01) |
| *G06V 30/40* | (2022.01) |
| *G06V 40/30* | (2022.01) |

(52) U.S. Cl.
CPC .............. *G06F 21/64* (2013.01); *G06F 21/32* (2013.01); *G06F 21/602* (2013.01); *G06V 30/40* (2022.01); *G06V 40/33* (2022.01); *G06V 40/394* (2022.01)

(58) Field of Classification Search
CPC ........ G06F 21/64; G06F 21/32; G06F 21/602; G06V 30/40; G06V 40/33; G06V 40/394
See application file for complete search history.

(56) References Cited

U.S. PATENT DOCUMENTS

| | | | |
|---|---|---|---|
| 6,918,535 B1 | 7/2005 | Brosow | |
| 7,107,454 B2 * | 9/2006 | Mori | G07C 9/22 713/180 |
| 7,170,391 B2 | 1/2007 | Lane et al. | |

(Continued)

OTHER PUBLICATIONS

Madasu et al., "Automatic Extraction of Signatures from Bank Cheques and other Document", VIIth Digital Image Computing: Techniques and Applications, Dec. 10-12, 2003, pp. 591-600.

(Continued)

*Primary Examiner* — Don G Zhao
(74) *Attorney, Agent, or Firm* — K&L Gates LLP

(57) ABSTRACT

Systems, apparatuses, methods, and computer program products are disclosed for authenticating handwriting on paper-based documents. An example method includes receiving, by an embedded chip device, handwriting information from a signature device in communication with the embedded chip device. The example method further includes transmitting, by the embedded chip device, document identification information to the signature device. The example method further includes receiving, by the embedded chip device, authentication information from the signature device. Subsequently, the example method includes storing, by the embedded chip device, the handwriting information and the authentication information as handwriting authentication metadata in association with the document identification information.

20 Claims, 5 Drawing Sheets

(56) References Cited

U.S. PATENT DOCUMENTS

| | | | |
|---|---|---|---|
| 7,930,642 B1* | 4/2011 | Gerde | H04N 1/40 |
| | | | 715/764 |
| 7,974,921 B1* | 7/2011 | Al Amri | G06Q 20/342 |
| | | | 235/3 |
| 8,832,800 B2* | 9/2014 | Garcia Perez | H04L 9/3247 |
| | | | 713/180 |
| 9,059,858 B1 | 6/2015 | Giardina et al. | |
| 9,369,287 B1* | 6/2016 | Sarvestani | G07D 7/01 |
| 9,411,971 B2* | 8/2016 | Follis | G06F 21/6209 |
| 9,485,087 B2 | 11/2016 | Van et al. | |
| 10,839,057 B1 | 11/2020 | Ramanathan et al. | |
| 2002/0040431 A1* | 4/2002 | Kato | G06F 21/64 |
| | | | 713/168 |
| 2002/0053021 A1* | 5/2002 | Rice | G06Q 10/10 |
| | | | 713/176 |
| 2003/0191852 A1* | 10/2003 | Incertis | G06F 16/955 |
| | | | 707/E17.112 |
| 2005/0038756 A1* | 2/2005 | Nagel | G06K 19/086 |
| | | | 705/76 |
| 2005/0099292 A1* | 5/2005 | Sajkowsky | G06Q 10/08 |
| | | | 340/10.51 |
| 2005/0183142 A1* | 8/2005 | Podanoffsky | G06F 21/31 |
| | | | 713/155 |
| 2005/0262034 A1* | 11/2005 | Carro | G06F 21/6209 |
| 2006/0010086 A1* | 1/2006 | Klein | G07B 17/00508 |
| | | | 705/410 |
| 2006/0020803 A1* | 1/2006 | O'Hagan | G06K 19/08 |
| | | | 713/176 |
| 2007/0188793 A1* | 8/2007 | Wakai | H04N 1/00912 |
| | | | 358/1.14 |
| 2007/0234058 A1* | 10/2007 | White | H04L 9/3247 |
| | | | 713/176 |
| 2008/0292136 A1* | 11/2008 | Ramani | H04N 1/32144 |
| | | | 382/100 |
| 2008/0301457 A1* | 12/2008 | Uesugi | H04L 9/3263 |
| | | | 713/178 |
| 2009/0235082 A1* | 9/2009 | Garrett | H04L 9/3231 |
| | | | 713/176 |
| 2010/0053691 A1* | 3/2010 | Kuyper-Hammond | |
| | | | H04N 1/32229 |
| | | | 358/3.28 |
| 2011/0060622 A1* | 3/2011 | Piersol | G06F 11/1474 |
| | | | 707/637 |
| 2011/0072274 A1* | 3/2011 | Leoutsarakos | H04L 63/0823 |
| | | | 713/182 |
| 2011/0204142 A1* | 8/2011 | Rao | G06Q 10/10 |
| | | | 235/492 |
| 2012/0072859 A1* | 3/2012 | Wang | G06V 30/40 |
| | | | 715/764 |
| 2012/0092350 A1* | 4/2012 | Ganapathi | G06F 3/04146 |
| | | | 29/829 |
| 2012/0190405 A1* | 7/2012 | Kumaran | H04M 1/0266 |
| | | | 455/556.2 |
| 2013/0021344 A1* | 1/2013 | Wang | G06V 30/40 |
| | | | 345/581 |
| 2013/0246799 A1* | 9/2013 | Balinsky | G06F 21/6209 |
| | | | 713/176 |
| 2015/0095999 A1* | 4/2015 | Toth | H04L 9/3263 |
| | | | 726/6 |
| 2015/0113282 A1* | 4/2015 | Basil | H04L 63/12 |
| | | | 713/176 |
| 2015/0129655 A1 | 5/2015 | Naik et al. | |
| 2015/0222437 A1* | 8/2015 | Gertner | G06F 21/64 |
| | | | 713/176 |
| 2016/0269184 A1* | 9/2016 | VanBlon | H04L 9/3247 |
| 2018/0005186 A1* | 1/2018 | Hunn | G06F 16/219 |
| 2018/0046889 A1* | 2/2018 | Kapinos | G06F 16/93 |
| 2018/0089471 A1* | 3/2018 | Chiarella | G06F 21/36 |
| 2018/0107818 A1* | 4/2018 | Wu | G06F 21/31 |
| 2018/0211255 A1* | 7/2018 | Matos | G07C 13/00 |
| 2018/0260617 A1* | 9/2018 | Jones | G06K 7/1417 |
| 2018/0288040 A1* | 10/2018 | Kursun | H04L 63/0861 |
| 2019/0026736 A1 | 1/2019 | Maheshwari et al. | |
| 2019/0121454 A1* | 4/2019 | Kolarov | G06F 3/03545 |

OTHER PUBLICATIONS

Subpratatsavee et al., "An Implementation of a Paper Based Authentication Using HC2D Barcode and Digital Signature", Computer Information Systems and Industrial Management, 13th IFIP TCB International Conference, 2014, pp. 592-601.

Trevathan et al., "Remote Handwritten Signature Authentication", In Proceedings of the Second International Conference on e-Business and Telecommunication Networks, 2005, pp. 335-339.

Warasart et al., "Paper-based Document Authentication using Digital Signature and QR Code", 2012 4th International Conference on Computer Engineering and Technology (ICCET 2012), 2012, 5 pages.

Xu et al., "Electronic Check System Design Based on NFC", Management and Service Science, 2009. MASS '09, International Conference, 2009, 4 pages.

* cited by examiner

SYSTEMS AND METHODS FOR PROVIDING ELECTRONIC INFRASTRUCTURE ON PAPER DOCUMENTS

CROSS-REFERENCE TO RELATED APPLICATIONS

This non-provisional application is a continuation of U.S. patent application Ser. No. 17/070,322, filed Oct. 14, 2020, which is a continuation of U.S. patent application Ser. No. 15/972,529, filed May 7, 2018, now issued U.S. Pat. No. 10,839,057, issued Nov. 17, 2020, and entitled "Systems And Methods For Providing Electronic Infrastructure On Paper Documents," the entirety of which are incorporated herein by reference.

TECHNOLOGICAL FIELD

Embodiments of the present disclosure relate generally to providing electronic infrastructure on paper documents and, more particularly, to systems and methods for providing electronic authentication of handwriting on paper documents

BACKGROUND

Modern technology has led to a promulgation of electronic documents. However, certain paper-based documents, such as paper-based financial documents (e.g., loan and mortgage documents, checks, and other financial instruments), remain popular among users of those documents. For example, in the United States and in many parts of the world, people are very comfortable with paper-based financial documents and, in many instances, trust paper-based financial documents with handwritten signatures more than electronic financial documents with digital or electronic signatures. Even if trust in electronic financial documents were to increase, it might take many years before the entire collection of financial documents that have an attached value could become completely digitized.

BRIEF SUMMARY

Systems, apparatuses, methods, and computer program products are disclosed herein for authenticating handwriting (e.g., signatures, writings, stamps, seals) on paper-based documents. The signature authentication system provided herein solves the above problems by providing for a paper-based document that includes an embedded chip for storing document identification information in association with signature authentication metadata generated by a remote authentication server device in response to a handwritten signature on the document.

In one example embodiment, a system is provided for authenticating handwriting on paper-based documents. The system may comprise a paper-based document comprising an embedded chip device configured to be in communication with a signature device. The embedded chip device may comprise electronic memory comprising document identification information indicative of an identity of the paper-based document. The embedded chip device may further comprise communications circuitry configured to receive, from the signature device, signature information indicative of a signature provided by a user on a surface of the paper-based document. The communications circuitry may be further configured to transmit, to the signature device, the document identification information for transmission to an authentication server device. The communications circuitry may be further configured to receive, from the signature device, authentication information indicating that the signature has been authenticated by the authentication server device based on the document identification information and the signature information. The embedded chip device may further comprise authentication storage circuitry configured to store, in the electronic memory, the signature information and the authentication information as signature authentication metadata in association with the document identification information.

In another example embodiment, an apparatus is provided for authenticating handwriting on paper-based documents. The apparatus may comprise an embedded chip device disposed on (e.g., on an exterior surface of), in (e.g., on an interior surface of, between two surfaces of), or near (e.g., in close physical proximity to) a paper-based document. The embedded chip device may be configured to be in communication with a signature device. The embedded chip device may comprise electronic memory comprising document identification information indicative of an identity of the paper-based document. The embedded chip device may further comprise communications circuitry configured to receive, from the signature device, signature information indicative of a signature provided by a user on a surface of the paper-based document. The communications circuitry may be further configured to transmit, to the signature device, the document identification information for transmission to an authentication server device. The communications circuitry may be further configured to receive, from the signature device, authentication information indicating that the signature has been authenticated by the authentication server device based on the document identification information and the signature information. The embedded chip device may further comprise authentication storage circuitry configured to store, in the electronic memory, the signature information and the authentication information as signature authentication metadata in association with the document identification information.

In another example embodiment, a method is provided for authenticating handwriting on paper-based documents. The method may comprise receiving, by an embedded chip device, signature information from a signature device in communication with the embedded chip device. The signature information may be indicative of a signature provided by a user on a surface of a paper-based document comprising the embedded chip device. The method may further comprise transmitting, by the embedded chip device, document identification information to the signature device. The document identification information may be indicative of an identity of the paper-based document. The method may further comprise receiving, by the embedded chip device, authentication information from the signature device. The authentication information may indicate that the signature has been authenticated by an authentication server device in communication with the signature device based on the document identification information and the signature information. The method may further comprise storing, by the embedded chip device, the signature information and the authentication information as signature authentication metadata in association with the document identification information.

In another example embodiment, a computer program product is provided for authenticating handwriting on paper-based documents. The computer program product may comprise at least one non-transitory computer-readable storage medium having computer-executable program code stored therein. The computer-executable program code may comprise program code instructions that, when executed, may cause an embedded chip device to receive signature information from a signature device in communication with the embedded chip device. The signature information may be indicative of a signature provided by a user on a surface of a paper-based document comprising the embedded chip device. The program code instructions, when executed, may further cause the embedded chip device to transmit document identification information to the signature device. The document identification information may be indicative of an identity of the paper-based document. The program code instructions, when executed, may further cause the embedded chip device to receive authentication information from the signature device. The authentication information may indicate that the signature has been authenticated by an authentication server device in communication with the signature device based on the document identification information and the signature information. The program code instructions, when executed, may further cause the embedded chip device to store the signature information and the authentication information as signature authentication metadata in association with the document identification information.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
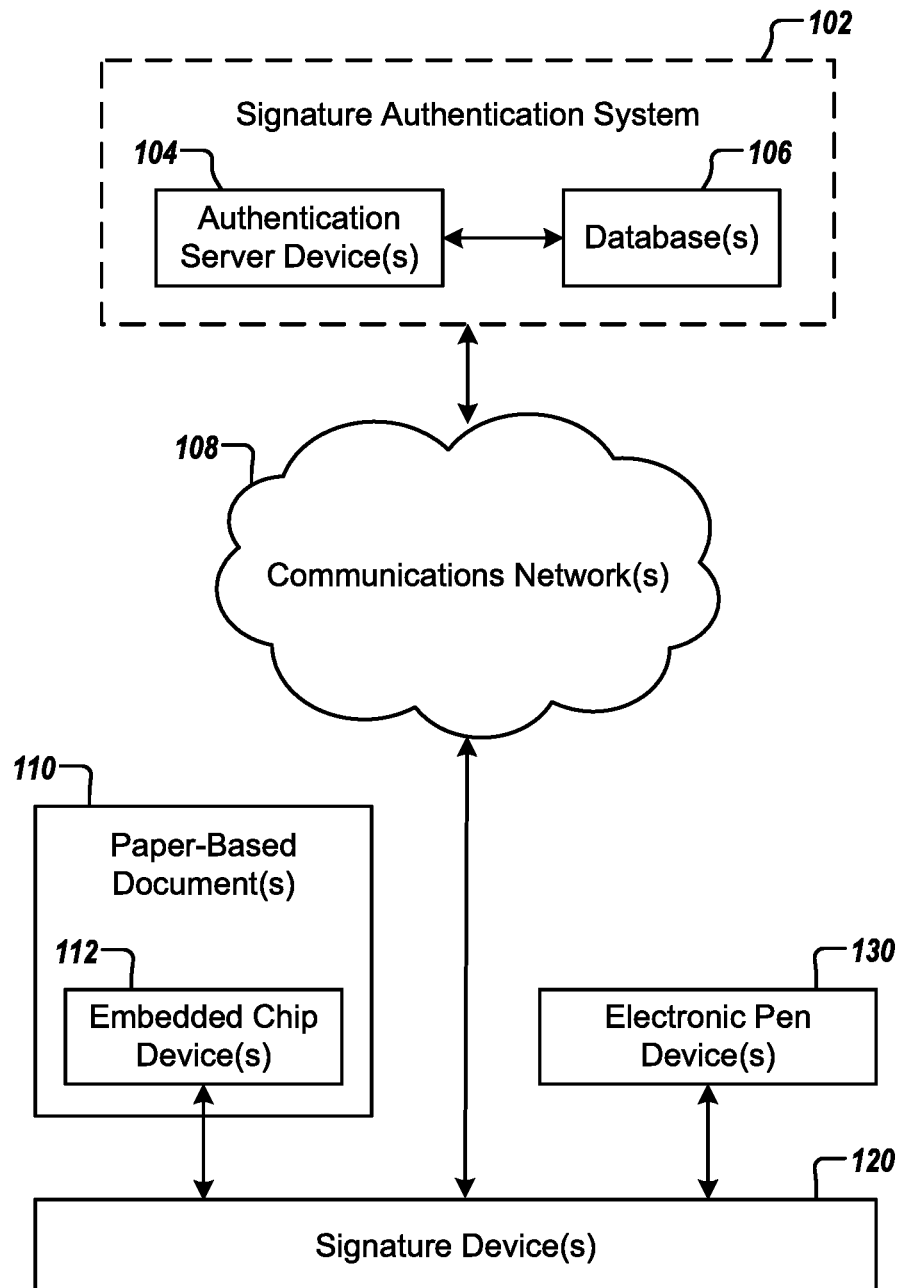
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for authenticating handwriting on paper-based documents. Traditionally, people are very comfortable with paper-based financial documents and trust paper-based financial documents with handwritten signatures more than electronic financial documents with digital or electronic signatures. Further, even if people began to increase their trust in electronic financial documents, it might take many years before the entire collection of financial documents that have an attached value could become completely digitized. Accordingly, the inventors have identified a latent need for a system wherein people may continue to use paper-based financial documents while enjoying the added benefits of electronic infrastructure, such as embedded chip devices, that provide for, among other benefits, increased trust in those documents; increased speed of transactions based on those documents; and more efficient management of identities and values associated with those documents.

In some embodiments, the present disclosure relates to providing electronic infrastructure on paper documents for identity and value management. In general, the present disclosure relates to a signature authentication system for authenticating handwriting, such as signatures and writings, on paper-based documents, such as checks. In some embodiments, the signature authentication system disclosed herein manages electronic infrastructure, such as an embedded chip devices that include radio frequency identification (RFID) and cryptography functionalities, on top of paper-based documents to provide for increased trust in those documents in addition to managing identities and associated values of those documents more efficiently.

In some embodiments, the signature authentication system disclosed herein provides for electronically capturing, in real-time, paper-based handwritten signatures along with other handwritten elements, such as the recipient, date, value (e.g., monetary value), comments, and alterations. In some embodiments, the signature authentication system disclosed herein provides for electronically verifying, in real-time, the captured paper-based handwritten signature for its authenticity. In some embodiments, the signature authentication system disclosed herein provides for electronically associating the signature with the document online along with the other metadata. In some embodiments, the signature authentication system disclosed herein provides for encoding a cryptographic representation of the signature along with other metadata in the paper-based document itself so that the document is verifiable offline. Other metadata may include, for example, timestamps, locations, mash-up locations, biometric information of the people who provided the handwriting (e.g., via signature devices, electronic pen devices, or both), unique device IDs, unique paper IDs, signer names, signer unique IDs, associated current values of the documents, other data or electronic information, and combinations thereof. In some embodiments, the signature authentication system disclosed herein subsequently provides for automatically transferring, in real-time, the value of the document, or the rights associated with the document, to the recipient without additional user input.

In some embodiments, the signature authentication system disclosed herein provides for generating electronic information verifying the authenticity of a signature on a paper document and storing authentication information in a chip embedded in the paper document. In some embodiments, the signature authentication system disclosed herein provides for recording the authentication information while the user signs the document. For example, the signature authentication system may capture a fingerprint via an electronic pen device and a picture or video of the signing of the paper via a separate imaging device. In some embodiments, the signature authentication system disclosed herein provides for transmitting the authentication information to an authentication server device for verification, after which the authentication information is transmitted to and stored in the chip embedded in the signed paper document.

In some embodiments, the signature authentication system disclosed herein provides for gathering electronic information about the signature and the signer, verifying that information at a server, and storing verified information in a chip embedded in the signed document. In some embodiments, the signature authentication system disclosed herein provides for storing information about the signature in the chip embedded in the paper. In some embodiments, the signature authentication system disclosed herein provides for using a separate server that authenticates gathered electronic information about the signature and the signer and then provides corresponding authentication information for storing in the chip embedded within the paper. In some embodiments, the signature authentication system disclosed herein provides for server authentication of recorded data gathered while signing a physical document and the subsequent embedding of authentication information received from the server within a chip in the physical document itself. In some embodiments, the signature authentication system disclosed herein provides that the chip interfaces with a signature device, such as a signing pad or smartphone, for validating user signatures.

There are many advantages of these and other embodiments described herein, such as: avoiding traditional problems surrounding electronic financial documents and paper-based financial documents; increasing trust in paper-based financial documents with electronic infrastructure; providing for continued use of paper-based financial documents while increasing trust in those documents, increasing the speed of transactions based on those documents, and more efficiently managing identities and values associated with those documents; preventing fraud (e.g., ensuring that shareholder dividend checks are accurate and have not been tampered with); and more quickly and easily digitizing paper-based financial documents that have an attached value. Further, because the embodiments disclosed herein process and verify (e.g., authenticate) handwritten signatures and other information on paper-based documents in real-time, or near real-time, those documents carry increased trust and thus, in many instances, can be transacted immediately.

Definitions

As used herein, the terms "data," "information," "signal," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," and "utility" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

The term "handwriting" includes, but is not limited to, handwritten signatures, words, initials, letters, characters, dates, numbers, marks (e.g., checkmarks, "x" s), drawings, shapes, lines (e.g., arrows, underlining, strike-through), and other suitable handwritings. In some embodiments, handwriting may also include stamps (e.g., signature stamps, name and address stamps, endorsement stamps, business stamps, notary stamps), seals (e.g., signature seals, notary seals, court seals), and other suitable handwriting substitutes. In some embodiments, handwriting may be ink-based (e.g., made using an ink-based pen or stamp). In some embodiments, handwriting may be lead-based (e.g., made using a pencil). In some embodiments, handwriting may be neither ink-based nor lead-based (e.g., indentations).

The term "paper-based document" includes, but is not limited to, paper-based financial documents, paper-based contracts, paper-based assignments, paper-based declarations, paper-based affidavits, paper-based agreements, and other paper-based documents, such as pieces of paper (e.g., white paper, colored paper, construction paper, poster paper, picture paper), cardboard, napkins, and other material suitable for handwriting. The term "paper-based financial document" includes, but is not limited to, paper-based negotiable instruments (e.g., checks, promissory notes), paper-based mortgage documents, paper-based loan documents, paper-based lien documents, paper-based lease documents, paper-based securities (e.g., stock certificates), paper-based shareholder dividend checks, paper-based secured transactions (e.g., security interests, security agreements, financing statements), paper-based title documents, paper-based deeds, paper-based wills (including, but not limited to, holographic wills), paper-based trusts, and other suitable paper-based financial documents.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more embedded chip devices, signature devices, electronic pen devices, or combinations thereof.

FIG. 1 illustrates a system diagram of a set of devices that may be involved in some example embodiments described herein. In this regard, FIG. 1 discloses an example environment 100 within which embodiments of the present disclosure may operate to authenticate handwriting provided by one or more users on one or more paper-based documents 110. As illustrated, a signature authentication system 102 may be connected to one or more authentication server devices 104 in communication with one or more databases 106. The signature authentication system 102 may be connected to one or more signature devices 120 through one or more communications networks 108 (e.g., the Internet, a wireless local area network (LAN), a virtual private network (VPN), a cellular network, other types of networks). The one or more signature devices 120 may be connected to one or more embedded chip devices 112 and one or more electronic pen devices 130, and the one or more embedded chip devices 112 may be connected to the one or more electronic pen devices 130, using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies or proximity-based communications protocols.

In some embodiments, the signature authentication system 102 may be configured to generate authentication information indicating that handwriting (e.g., a writing, a signature) provided on a paper-based document 110 has been authenticated (e.g., verified as authentic) as described in further detail below. Although referred to herein as a "signature" authentication system, it will be understood that the signature authentication system 102 may be more broadly considered to be a handwriting authentication system.

The signature authentication system 102 may be embodied as one or more computers or computing systems and may comprise one or more authentication server devices 104 and one or more databases 106. The one or more authentication server devices 104 may be embodied as one or more servers, remote servers, cloud-based servers (e.g., cloud utilities), processors, or any other suitable server devices, or any combination thereof. The one or more authentication server devices 104 receive, process, generate, and transmit data, signals, and electronic information to facilitate the operations of the signature authentication system 102. The one or more databases 106 may be embodied as one or more data storage devices, such as Network Attached Storage (NAS) devices or separate databases or servers. The one or more databases 106 include information accessed and stored by the signature authentication system 102 to facilitate the operations of the signature authentication system 102. For example, the one or more databases 106 may store user account credentials and authentic handwriting samples for users of one or more paper-based documents 110, one or more embedded chip devices 112, one or more signature devices 120, one or more electronic pen devices 130, or one or more combinations thereof. In another example, the one or more databases 106 may store data regarding device characteristics of various embedded chip devices 112, signature devices 120, electronic pen devices 130, or combinations thereof. In some embodiments, the user may have captured his or her handwritten signature, signature stamp, signature seal, handwriting samples, and biometric samples ahead of time using a user device. Example embodiments of the user devices include any of a variety of stationary or mobile computing devices, such as a portable digital assistant (PDA), mobile telephone, smartphone, smartwatch, smart speaker, tablet computer, laptop computer, desktop computer, kiosk computer, electronic workstation, any other suitable computing device, or any combination of the aforementioned devices. The user may user the user device to transmit that information to the signature authentication system 102, which may store that information in one or more databases 106 for use in subsequent authentication, by one or more authentication device servers 104, of signature information and writing information for signatures and writings claimed to have been provided by the user on one or more documents 110.

The one or more paper-based documents 110 may be embodied by any suitable paper-based document. For example, the paper-based document 110 may be a negotiable instrument, such as a check. In some embodiments, the paper-based document 110 may comprise one or more embedded chip devices 112. For example, the paper-based document 110 may comprise an embedded chip device 112 configured to be in communication with a signature device 120, an electronic pen device 130, or both.

The one or more one or more embedded chip devices 112 may be embodied by any suitable computing device. In some embodiments, the embedded chip device 112 may comprise an RFID chip with suitable processing power, secure memory, and the ability to connect securely to other devices located nearby (e.g., using wireless PAN technologies). In some embodiments, the embedded chip device 112 may be disposed on (e.g., on an exterior surface of), in (e.g., on an interior surface of, between two surfaces of), or near (e.g., in close physical proximity to) a paper-based document 110. The embedded chip device 112 may be configured to be in near field communication with a signature device 120. In some embodiments, the embedded chip device 112 may be disposed on an exterior surface of the paper-based document 110. In some embodiments, the embedded chip device 112 may comprise embedded chip device may be disposed on an interior surface the paper-based document. In some embodiments, the embedded chip device 112 may be configured to be in near field communication with the signature device 120, and the signature device may be configured to be in network communication with the authentication server device 104.

The one or more embedded chip devices 112 may comprise electronic memory comprising document identification information indicative of an identity of the paper-based document, such as one or more pre-determined elements about the document. The document identification information may comprise one or more document IDs, document numbers, unique identification information, or any other suitable information. In some embodiments, the document identification information may comprise a set of metadata elements that varies for each type of document. For example, the document identification information for a check may comprise a first set of metadata elements, the document identification information for a stock certificate may comprise a second set of metadata elements, and the document identification information for a will may comprise a third set of metadata elements, wherein the first, second, and third sets of metadata elements are different. In some embodiments, the embedded chip device 112 may have different read/write access levels for data stored by the embedded chip device 112. For instance, where the paper-based document 110 is a contract, the embedded chip device 112 may be configured to be read-only on a forward-looking basis. Alternatively, where the paper-based document 110 is a laboratory notebook page, the embedded chip device 112 may be configured for read-write access. In some embodiments, the paper-based document 110 may be a multi-page document wherein each page comprises a separate embedded chip device 112.

The one or more signature devices 120 may be embodied by any suitable computing device. In some embodiments, a signature device 120 may be embodied as an Internet connected device with a touch sensitive pad that can be used to sign the paper-based document 110 using the electronic pen device 130. The signature device 120 many have NFC communications capabilities (e.g., an electronic reader device) to request and receive information from, and transmit information to, the embedded chip device 112, the electronic pen device 130, or both. The signature device 120 many have network communications capabilities to request and receive information from, and transmit information to, the signature authentication system 102 and the authentication server devices 104. In some embodiments, the signature device 120 may be embodied as a user device (e.g., a mobile device such as a smartphone or a smartwatch). In some embodiments, the signature device 120 may have a imaging device (e.g., a camera) that captures the signature information, writing information, and/or biometric information for handwriting provided by the user on the paper-based document 110 using the electronic pen device 130 or any other suitable writing device (e.g., an ink-based pen, a pencil, a stamp, a seal). Although referred to herein as "signature" devices, it will be understood that the one or more signature devices 120 may be more broadly considered to be handwriting processing devices.

Information received by the signature authentication system 102 from the one or more signature devices 120 may be provided in various forms and via various methods. For example, the one or more signature devices 120 may be laptop computers, smartphones, netbooks, tablet computers, wearable devices, desktop computers, electronic workstations, or the like, and the information may be provided through various modes of data transmission provided by these signature devices. In some embodiments, the one or more signature devices 120 may include or store various data and electronic information associated with one or more users. For example, the one or more signature devices 120 may include or store user information, signature information, writing information, biometric information, authentication information, or a combination thereof. In some instances where the paper-based document 110 is a check, the signature information may comprise a signature provided by the payer; a signature provided by the payee; an endorsement provided by the payee that restricts how the check can be used; or a combination thereof. In some instances where the paper-based document 110 is a check, the writing information may comprise a handwritten date of the check; a handwritten name of the payee; a handwritten value of the check in numerical format; a handwritten value of the check in word format; a handwritten memo or note; or a combination thereof.

In embodiments where a signature device 120 is a mobile device, such as a smartphone or tablet, the mobile device may execute an "app" (e.g., a thin-client application) to interact with the signature authentication system 102, one or more authentication server devices 104, one or more embedded chip devices 112, one or more electronic pen devices 130, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, handwriting processing circuitry, biometric processing circuitry, wired and wireless network communications interfaces, user contacts, and other applications in a manner that allows for improved interactions between apps while also preserving the privacy and security of individual users. In some embodiments, a mobile operating system may also provide for improved communications interfaces for interacting with external devices (e.g., embedded chip devices, electronic pen devices, authentication server devices). Communication with hardware and software modules executing outside of the app is typically provided via APIs provided by the mobile device operating system.

The one or more electronic pen devices 130 may be embodied by any suitable electronic handwriting device, such as a biometric smart pen comprising force sensors, pressure sensors, accelerometers, gyroscopes, motion sensors, fingerprint scanners, electrocardiogram devices, iris imaging devices, and other suitable components. In some embodiments, the electronic pen device 130 may be configured to capture biometric information (e.g., speed, acceleration, angle, force, pressure, fingerprint, electrocardiogram, iris information) of a user while the user is using electronic pen device 130 to handwrite on paper-based document 110 and transmit the captured biometric information to the signature device 120.

Figure 3:
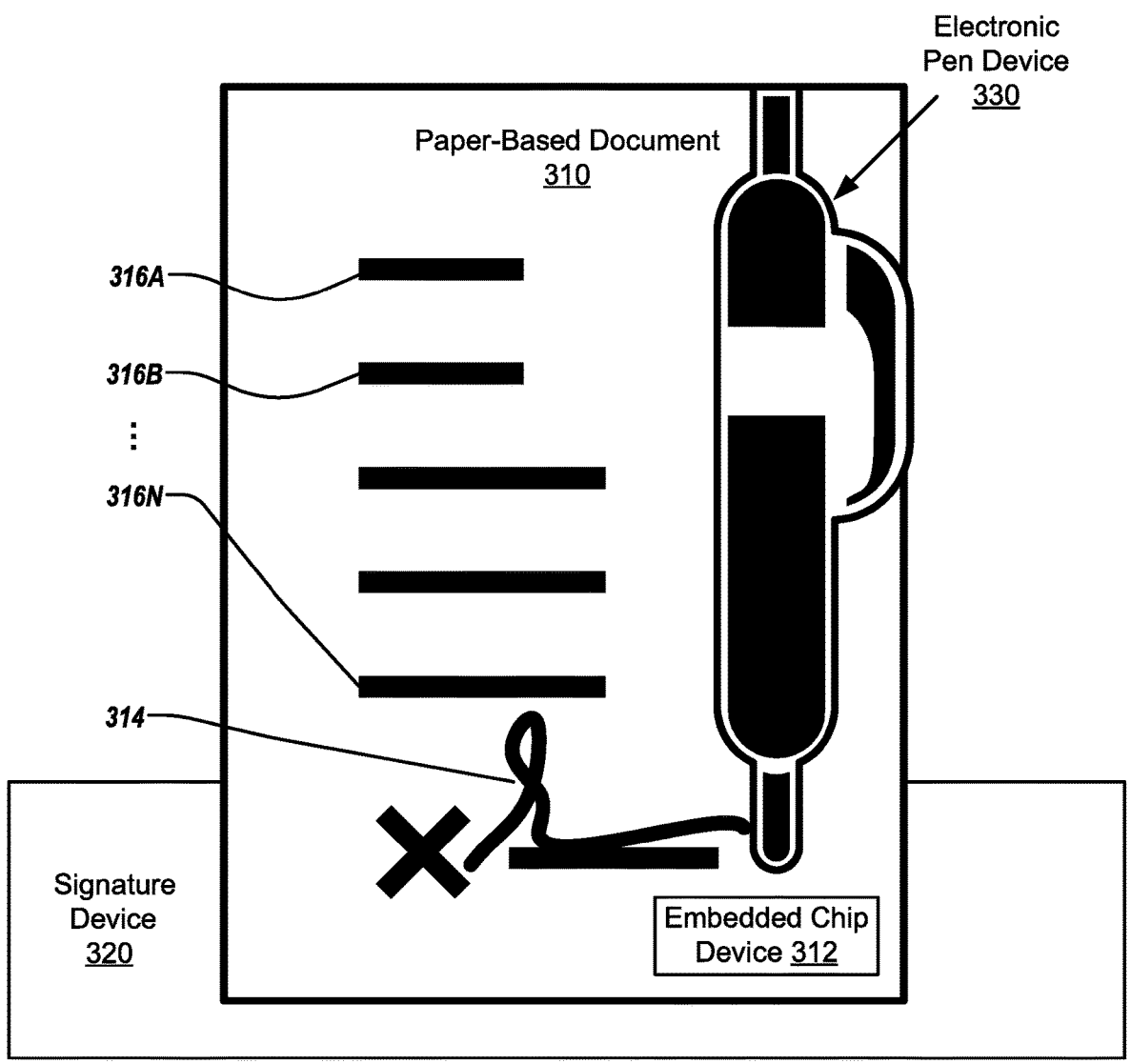
FIG. 3 illustrates top-down view of a schematic diagram of a set of devices that may be involved in some example embodiments described herein.
Figure 4:
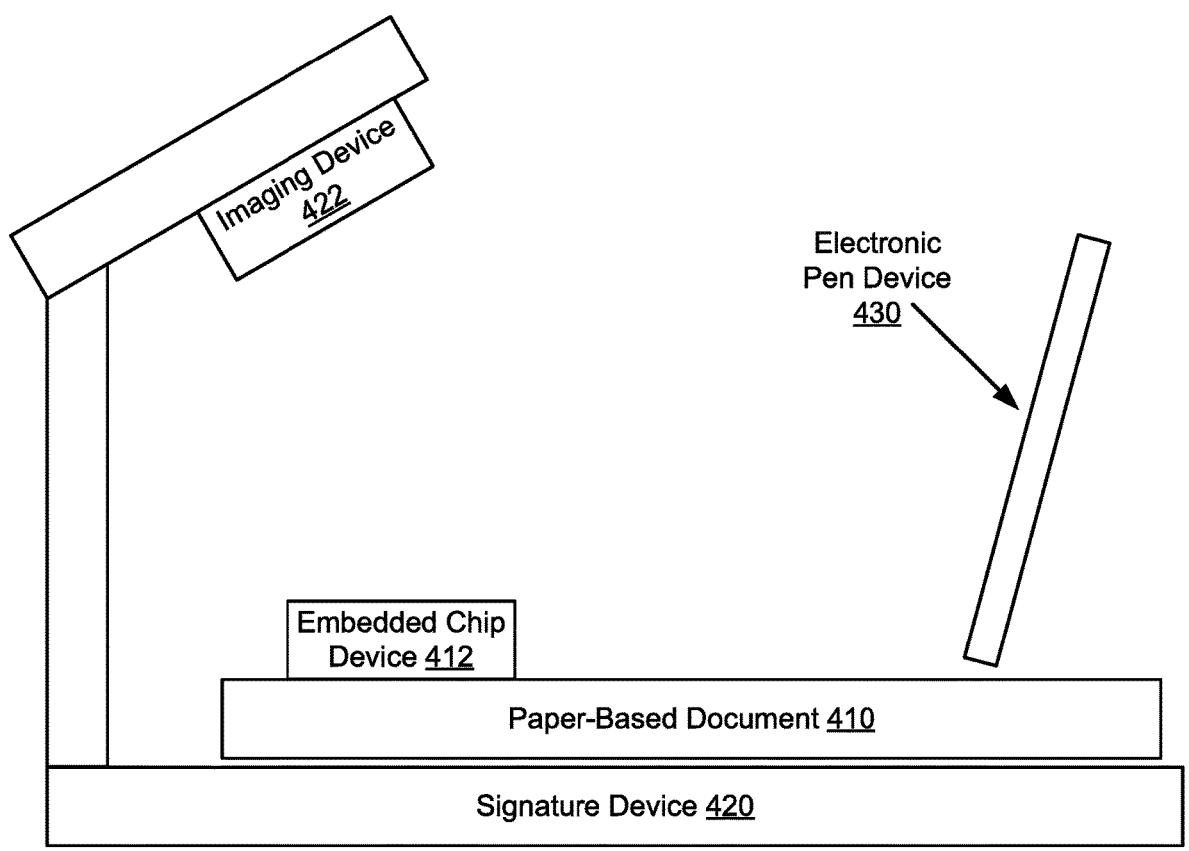
FIG. 4 illustrates a side view of a schematic diagram of a set of devices that may be involved in some example embodiments described herein.

In an illustrative set of embodiments, a user may place a paper-based document 110 comprising an embedded chip device 112 on the signature device 120. For example, where the signature device comprises a touch-sensitive pad, the user may lay the paper-based document 110 on the signature device 120 in such a way the writable portion will be on the top of the touch-sensitive pad (as shown in FIG. 3). In another example, where the signature device comprises an imaging device, the user may lay the paper-based document 110 on the signature device 120 in such a way the writable portion will be visible to the imaging device (as shown in FIG. 4). As soon as the paper-based document 110 is placed on the signature device 120, the embedded chip device 112 securely connects with the signature device 120 and transmits document identification information to the signature device. The document identification information may be indicative of an identity of the paper-based document.

Next, the user may provide handwriting on a surface of the paper-based document 110. The signature device 120 may generate signature information, writing information, or both and transmit that information to the embedded chip device 112, the authentication server device 104, or both. The signature information may be indicative of a signature provided by a user on a surface of a paper-based document comprising the embedded chip device. The writing information may be indicative of a writing provided by a user on a surface of a paper-based document comprising the embedded chip device. For example, as soon as the user signs or writes on the document, the signature device 120 captures the signature or writing, along with other information from a touch-sensitive area of the signature device 120, an imaging device of signature device 120, the sensors of the electronic pen device 130, or a combination thereof. The electronic pen device 130 may also capture the user's biometric information and transmit the captured biometric information to the signature device 120.

Then, the signature device 120 securely connects with the signature authentication system 102. The signature device 120 encrypts the document identification information, signature information, writing information, biometric information, or a combination thereof and securely transmits the encrypted information to the signature authentication system 102, which receives decrypts that information for analysis by authentication server device 104. The authentication server device 104 determines whether to authenticate (e.g., verify) the signature or writing based on the document identification information, the signature information, the writing information, the biometric information, or a combination thereof.

In some embodiments, the user may have previously provided authentic signature information (e.g., signature samples) to the signature authentication system 102, which may store the user's authentic signature information in database 106. Subsequently, the authentication server device 104 may receive signature information claimed to have been provided by the user on a paper-based document 110, retrieve the authentic signature information from database 106, and determine whether to authenticate the document based on a comparison (e.g., a correlation) of the received signature information and the authentic signature information.

In some embodiments, the issuer of the paper-based document 110 may have previously provided authentic document information (e.g., authentic document identification information, authentic monetary values, authentic terms) to the signature authentication system 102, which may store the authentic document information in database 106. Subsequently, the authentication server device 104 may receive document information claimed to be associated with the paper-based document 110, retrieve the authentic document information from database 106, and determine whether to authenticate the document based on a comparison (e.g., a correlation) of the received document information and the authentic document information. For example, the authentic document information may comprise a monetary value (e.g., $10.00), and the received document information may comprise a different monetary value (e.g., $100.00).

In response to determining that the received monetary value does not correspond to the authentic monetary value, the signature authentication system 102 may generate authentication information indicative of the authentic monetary value (e.g., $10.00).

In some embodiments, the user may have previously provided authentic writing information (e.g., handwriting samples) to the signature authentication system 102, which may store the user's authentic writing information in database 106. Subsequently, the authentication server device 104 may receive writing information claimed to have been provided by the user on a paper-based document 110, retrieve the authentic writing information from database 106, and determine whether to authenticate the document based on a comparison (e.g., a correlation) of the received writing information and the authentic writing information.

In some embodiments, the user may have previously provided authentic biometric information (e.g., biometric samples) to the signature authentication system 102, which may store the user's authentic biometric information in database 106. Subsequently, the authentication server device 104 may receive biometric information claimed to have been provided by the user when signing or writing on a paper-based document 110, retrieve the authentic biometric information from database 106, and determine whether to authenticate the document based on a comparison (e.g., a correlation) of the received biometric information and the authentic biometric information.

If the authentication server device 104 determines that the signature or writing is authentic, the authentication server device 104 generates authentication information indicating that the signature or writing has been authenticated. The authentication information may comprise an electronic confirmation or acknowledgement that the signature or writing is valid. Subsequently, the signature authentication system 102 transmits the authentication information to the signature device 120. The signature device 120 then transmits the authentication information to the embedded chip device 112. The embedded chip device 112 receives the authentication information and stores, in the electronic memory: the signature information and the authentication information as signature authentication metadata in association with the document identification information; and the writing information and the authentication information as writing authentication metadata in association with the document identification information. As a result, the embedded chip device 112 contains cryptographically secured proof of the validity and authenticity of signatures and writings on paper-based document 110, as well as other information about the document, such that forgery is nearly impossible. In some embodiments, the signature authentication system 102 may provide for authenticating signatures and writings on multiple types of paper-based documents 110. In some embodiments, the signature authentication system 102 may provide for authenticating multiple signatures and writings by multiple users in the same paper-based document 110.

Example Implementing Apparatus

Figure 2:
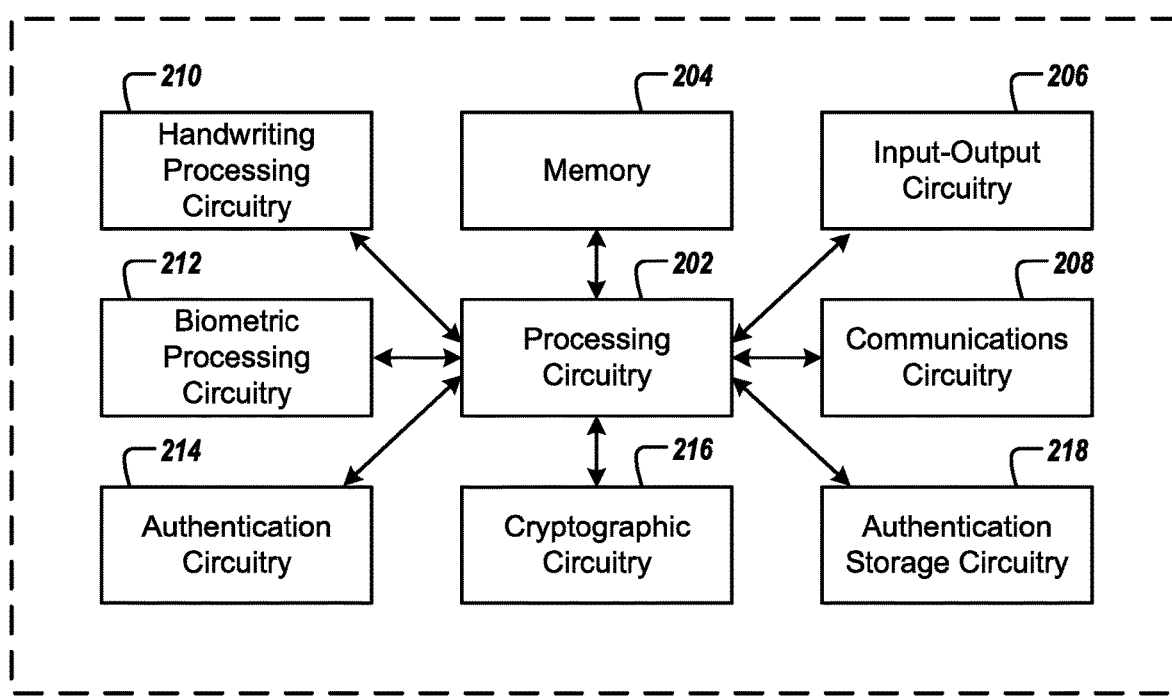
FIG. 2 illustrates a schematic block diagram of example circuitry that may perform various operations in accordance with some example embodiments described herein.

The signature authentication system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, handwriting processing circuitry 210, biometric processing circuitry 212, authentication circuitry 214, cryptographic circuitry 216, and authentication storage circuitry 218. The apparatus 200 may be configured to execute the operations described above with respect to FIG. 1 and below with respect to FIGS. 3-5. Although some of these components 202-218 are described with respect to their functional capabilities, it should be understood that the particular implementations necessarily include the use of particular hardware to implement such functional capabilities. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure. For example, the memory 204 may be configured to store document identification information, authentic document identification information, signature information, authentic signature information, writing information, authentic writing information, biometric information, authentic biometric information authentication information, and other data and information disclosed herein. It will be understood that the memory 204 may be configured to store any electronic information, data, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface and may include a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless PAN technologies, such as Bluetooth®, BLE, IrDA, UWB, induction wireless transmission, or any other suitable technologies. In addition, it should be understood that these signals may be transmitted using Wi-Fi, NFC, WiMAX, or other proximity-based communications protocols.

In some embodiments, the communications circuitry 208 includes hardware components designed or configured to receive, from a signature device, signature information indicative of a signature provided by a user on a surface of the paper-based document. In some embodiments, the communications circuitry 208 includes hardware components designed or configured to transmit, to the signature device, the document identification information for transmission to an authentication server device. In some embodiments, the communications circuitry 208 includes hardware components designed or configured to receive, from the signature device, authentication information indicating that the signature has been authenticated by the authentication server device based on the document identification information and the signature information.

In some embodiments, wherein in an instance in which the signature is provided by the user on the surface of the paper-based document using an electronic pen device configured to obtain biometric information indicative of an identity of the user, the communications circuitry 208 includes hardware components designed or configured to receive, from the signature device, the biometric information. The communications circuitry 208 may be further configured to receive, from the signature device, the authentication information indicating that the signature has been authenticated by the authentication server device based on the document identification information, the signature information, and the biometric information.

In some embodiments, the communications circuitry 208 includes hardware components designed or configured to receive, from the signature device, the signature information less than about one second after the signature was provided by the user on the surface of the paper-based document. In some embodiments, the communications circuitry 208 includes hardware components designed or configured to transmit, to the signature device, the document identification information less than about one second after the signature information was received from the signature device.

In some embodiments, wherein the signature is a first writing and the authentication information is first authentication information, the communications circuitry 208 includes hardware components designed or configured to receive, from the signature device, writing information indicative of a second writing provided by the user on the surface of the paper-based document. The communications circuitry 208 may be further configured to receive, from the signature device, second authentication information indicating that the second writing has been authenticated by the authentication server device based on the document identification information and the writing information.

In some embodiments, wherein the user is a first user, the signature is a first signature, the signature information is first signature information, and the authentication information is first authentication information, the communications circuitry 208 includes hardware components designed or configured to receive, from the signature device, second signature information indicative of a second signature provided by a second user on the surface of the paper-based document. The communications circuitry 208 may be further configured to receive, from the signature device, second authentication information indicating that the second signature has been authenticated by the authentication server device based on the document identification information and the second signature information.

The handwriting processing circuitry 210 includes hardware components designed or configured to capture and process handwriting (e.g., signatures, writings, stamps, seals) provided by a user on a paper-based document. For example, the handwriting processing circuitry 210 may include a touch-sensitive pad, an imaging device, or both for capturing handwriting in real-time. The handwriting processing circuitry 210 may be further configured to generate signature information indicative of a signature provided by a user on a surface of the paper-based document. The handwriting processing circuitry 210 may be further configured to generate writing information indicative of a writing provided by a user on a surface of the paper-based document.

The biometric processing circuitry 212 includes hardware components designed or configured to capture and process biometric information provided by a user while writing on a paper-based document. For example, the biometric processing circuitry 212 may include pressure sensors, accelerometers, gyroscopes, motion sensors, fingerprint scanners, electrocardiogram devices, iris imaging devices, and other suitable components for capturing biometric information in real-time. The biometric processing circuitry 212 may be further configured to generate biometric information biometric information indicative of an identity of the user.

The authentication circuitry 214 may be further configured to generate authentication information indicating that a signature, a writing, or both has been authenticated by an authentication server device based on document identification information, signature information, writing information, the biometric information, or a combination thereof. For example, the authentication circuitry 214 may receive signature information, writing information, and/or biometric information claimed to have been provided by the user, retrieve the authentic signature information, authentic writing information, and/or authentic biometric information from memory 204, and determine whether to authenticate the signature information, writing information, and/or biometric information based on a comparison (e.g., a correlation) of the received signature information and the authentic signature information, the writing information and the authentic writing information, and/or the biometric information and the authentic biometric information.

The cryptographic circuitry 216 includes hardware components designed or configured to generate security keys and encrypt and decrypt data. In some embodiments, the cryptographic circuitry 216 may be configured to generate a pair of security keys comprising a first security key (e.g., a private key) and a second security key (e.g., a public key). In some embodiments, the cryptographic circuitry 216 may be configured to encrypt document identification information, signature information, writing information, biometric information, and authentication information using the first security key. In some embodiments, the cryptographic circuitry 216 may be configured to decrypt encrypted document identification information, encrypted signature information, encrypted writing information, encrypted biometric information, and encrypted authentication information using the second security key.

The authentication storage circuitry 218 includes hardware components designed or configured to store, in electronic memory (e.g., memory 204), the signature information and the authentication information as signature authentication metadata in association with the document identification information. The authentication storage circuitry 218 may be further configured to store, in the electronic memory, the biometric information, the signature information, and the authentication information as the signature authentication metadata in association with the document identification information. In some embodiments, wherein the authentication information is first authentication information, the authentication storage circuitry 218 may be further configured to store, in the electronic memory, the writing information and the second authentication information as writing authentication metadata in association with the document identification information.

It should also be appreciated that, in some embodiments, each of the handwriting processing circuitry 210, biometric processing circuitry 212, authentication circuitry 214, cryptographic circuitry 216, and authentication storage circuitry 218 may include a separate processor, specially configured field programmable gate array (FPGA), application specific interface circuit (ASIC), or cloud utility to perform the above functions.

In some embodiments, the hardware components described above with reference to handwriting processing circuitry 210, biometric processing circuitry 212, authentication circuitry 214, cryptographic circuitry 216, and authentication storage circuitry 218 may, for instance, utilize communications circuitry 208 or any suitable wired or wireless communications path to communicate with an embedded chip device (e.g., one or more of embedded chip devices 112), a signature device (e.g., one or more of signature devices 120), an electronic pen device (e.g., one or more of electronic pen devices 130), each other, or any other suitable circuitry or device.

In some embodiments, one or more of the handwriting processing circuitry 210, biometric processing circuitry 212, authentication circuitry 214, cryptographic circuitry 216, and authentication storage circuitry 218 may be hosted locally by the apparatus 200. In some embodiments, one or more of the handwriting processing circuitry 210, biometric processing circuitry 212, authentication circuitry 214, cryptographic circuitry 216, and authentication storage circuitry 218 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the handwriting processing circuitry 210, biometric processing circuitry 212, authentication circuitry 214, cryptographic circuitry 216, and authentication storage circuitry 218.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more authentication server devices 104, one or more embedded chip devices 112, one or more signature devices 120, and one or more electronic pen devices 130 may be embodied by one or more computing devices or systems that also may include processing circuitry, memory, input-output circuitry, and communications circuitry. For example, an authentication server device 104 may be a database server on which computer code (e.g., C, C++, C #, java, a structured query language (SQL), a data query language (DQL), a data definition language (DDL), a data control language (DCL), a data manipulation language (DML)) is running or otherwise being executed by processing circuitry. In another example, a signature device 120 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the signature authentication system described herein.

FIG. 3 illustrates a top-down view of a schematic diagram of an example system 300 comprising set of devices that may be involved in some example embodiments described herein. In accordance with some example embodiments, example system 300 may include paper-based document 310, embedded chip device 312, signature device 320, and electronic pen device 330. In some embodiments, the signature device 320 may include a touch-sensitive pad for capturing handwritten signature 314 and handwritten writings 316A-316N provided by a user on a surface of paper-based document 310 using electronic pen device 330. In some embodiments, signature 314 may be a handwritten signature provided by the user using a general purpose writing instrument (e.g., a non-electronic pen or pencil). In some embodiments, signature 314 may be a stamp-based signature provided by the user using a signature stamp. In some embodiments, signature 314 may be a seal-based signature provided by the user using a signature seal.

FIG. 4 illustrates a side view of a schematic diagram of an example system 400 comprising a set of devices that may be involved in some example embodiments described herein. In accordance with some example embodiments, example system 400 may include paper-based document 410, embedded chip device 412, signature device 420, and electronic pen device 430. The signature device 420 may include an imaging device 422 for capturing handwritten (as well as stamp-based and seal-based) signatures and writings provided by a user on a surface of paper-based document 410 using electronic pen device 330. In some embodiments, the imaging device 422 may be configured to capture handwritten (as well as stamp-based and seal-based) signatures and writings provided by a user on a surface of paper-based document 410 using a general purpose writing instrument (e.g., a non-electronic pen, pencil, stamp, or seal).

Having described specific components of example devices involved in the present disclosure, example procedures for authenticating handwriting are described below in connection with FIG. 5.

Example Operations for Authenticating Handwriting

Figure 5:
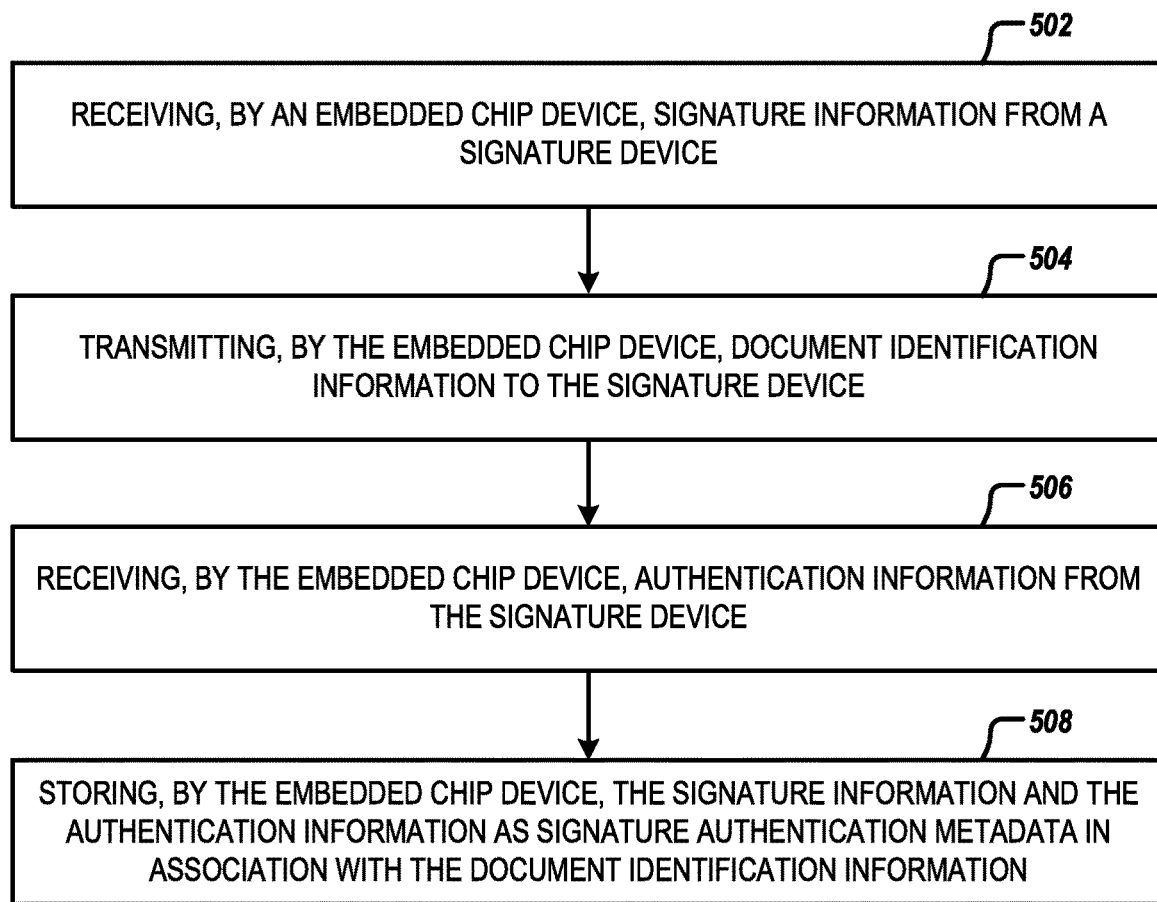
FIG. 5 illustrates an example flowchart for authenticating handwriting on paper-based documents in accordance with some example embodiments described herein.

FIG. 5 illustrates an example flowchart 500 that contains example operations for authenticating handwriting on paper-based documents according to an example embodiment. The operations illustrated in FIG. 5 may, for example, be performed by one or more components described with reference to signature authentication system 102 shown in FIG. 1; by an embedded chip device 112, a signature device 120, or an electronic pen device 130 in communication with signature authentication system 102; by apparatus 200 shown in FIG. 2; by an embedded chip device 312, a signature device 320, or an electronic pen device 330 shown in FIG. 3; by an embedded chip device 412, a signature device 420, an imaging device 422, or an electronic pen device 430 shown in FIG. 4; or by any combination thereof. In some embodiments, the various operations described in connection with FIG. 5 may be performed by the apparatus 200 by or through the use of one or more of processing circuitry 202, memory 204, input-output circuitry 206, communications circuitry 208, handwriting processing circuitry 210, biometric processing circuitry 212, authentication circuitry 214, cryptographic circuitry 216, authentication storage circuitry 218, any other suitable circuitry, and any combination thereof.

As shown by operation 502, the embedded chip device (e.g., embedded chip device 112, 312, 412) may be implemented in an apparatus 200 that includes means, such as communications circuitry 208 or the like, for receiving signature information from a signature device (e.g., signature device 120, 320, 420) in communication with the embedded chip device. In some embodiments, the embedded chip device may be in near field communication with the signature device. The signature information may be indicative of a signature (e.g., signature 314) provided by a user on a surface of a paper-based document (e.g., paper-based document 110, 310, 410) comprising the embedded chip device. In some embodiments, the apparatus 200 may provide for receiving the signature information from the signature device in real-time or near real-time. For example, the apparatus 200 may provide for receiving the signature information from the signature device less than about one second after the signature was provided by the user on the surface of the paper-based document.

As shown by operation 504, the embedded chip device may be implemented in an apparatus 200 that includes means, such as communications circuitry 208 or the like, for transmitting document identification information to the signature device. The document identification information may be indicative of an identity of the paper-based document. In some embodiments, the embedded chip device may comprise electronic memory (e.g., memory 204) comprising the document identification information. In some embodiments, the apparatus 200 may transmit the document identification information to the signature device for transmission to an authentication server device (e.g., authentication server device 104). In some embodiments, the apparatus 200 may provide for transmitting the document identification information to the signature device in real-time or near real-time. For example, the apparatus 200 may provide for transmitting the document identification information to the signature device less than about one second after the signature information was received from the signature device. In some embodiments, the signature device may not transmit the signature information to the embedded chip device until after the authentication by the authentication server device. In some embodiments, the signature information is never provided to the embedded chip device, and all that the embedded chip device receives from the signature device is a token (e.g., an electronic token generated by the authentication server device) that can be provided (e.g., through the signature device or a different signature device) back to the authentication server device for verification.

As shown by operation 506, the embedded chip device may be implemented in an apparatus 200 that includes means, such as communications circuitry 208 or the like, for receiving authentication information from the signature device. The authentication information may indicate that the signature has been authenticated by an authentication server device (e.g., authentication server device 104) in communication with the signature device based on the document identification information and the signature information. In some embodiments, the signature device may be in network communication with the authentication server device over a communications network (e.g., communications network 108).

As shown by operation 508, the embedded chip device may be implemented in an apparatus 200 that includes means, such as authentication storage circuitry 218 or the like, for storing the signature information and the authentication information as signature authentication metadata in association with the document identification information.

In some embodiments, operations 502, 504, 506, and 508 may not necessarily occur in the order depicted in FIG. 5, and in some cases one or more of the operations depicted in FIG. 5 may occur substantially simultaneously, or additional steps may be involved before, after, or between any of the operations shown in FIG. 5.

In one optional operation, the embedded chip device may be implemented in an apparatus 200 that includes means, such as cryptographic circuitry 216 or the like, for encrypting the document identification information, the signature information, and the authentication information. The apparatus 200 may further include means, such as authentication storage circuitry 218, for storing encrypted signature information and encrypted authentication information as encrypted signature authentication metadata in association with encrypted document identification information.

In another optional operation, the signature may be provided by the user on the surface of the paper-based document using an electronic pen device (e.g., electronic pen device 130, 330, 430) configured to obtain biometric information indicative of an identity of the user. In some embodiments, the electronic pen device may be in communication with the signature device and configured to transmit the biometric information to the signature device for transmission to an authentication server device, an embedded chip device, or both. In some embodiments, the electronic pen device may be in communication with the embedded chip device and configured to transmit the biometric information to the embedded chip device. In some embodiments, the embedded chip device may be implemented in an apparatus 200 that includes means, such as communications circuitry 208 or the like, for receiving the biometric information from the signature device or the electronic pen device. In some embodiments, the apparatus 200 includes means, such as communications circuitry 208 or the like, for receiving the authentication information from the signature device, wherein the authentication information indicates that the signature has been authenticated by the authentication server device based on the document identification information, the signature information, and the biometric information. In some embodiments, the apparatus 200 includes means, such as authentication storage circuitry 218 or the like, for storing the biometric information, the signature information, and the authentication information as the signature authentication metadata in association with the document identification information.

In yet another optional operation, multiple users may provide multiple signatures on the paper-based document. For instance, in operations 502-508 described above, the user is a first user, the signature is a first signature, the signature information is first signature information, the authentication information is first authentication information, and the signature authentication metadata is first signature authentication metadata. In some embodiments, the embedded chip device may be implemented in an apparatus 200 that includes means, such as communications circuitry 208 or the like, for receiving second signature information from the signature device. The second signature information may be indicative of a second signature provided by a second user on the surface of the paper-based document. In some embodiments, the apparatus 200 includes means, such as communications circuitry 208 or the like, for receiving second authentication information from the signature device, wherein the second authentication information indicates that the second signature has been authenticated by the authentication server device based on the document identification information and the second signature information. In some embodiments, the apparatus 200 includes means, such as authentication storage circuitry 218 or the like, for storing the second signature information and the second authentication information as second signature authentication metadata in association with the document identification information.

As noted above, methods, apparatuses, systems, and computer program products are described herein that provide for authenticating handwriting on paper-based documents. By doing so, people are able to avoid the traditional problems surrounding signature authentication in paper-based financial documents (e.g., loan and mortgage documents, checks, and other financial instruments). For instance, through performance of the above operations, people can gain increased trust in paper-based financial documents with electronic infrastructure, such as an embedded chip device. Further, through performance of the above operations, people can continue to use paper-based financial documents while enjoying the added benefits of increased trust and more efficient management of identities and associated values of paper-based financial documents provided by the electronic infrastructure disclosed herein. Further still, through performance of the above operations, paper-based financial documents that have an attached value may become digitized more quickly and easily. For example, because the embodiments disclosed herein process and verify (e.g., authenticate) handwritten signatures and other information on paper-based documents in real-time, or near real-time, those documents carry increased trust and thus, in many instances, can be transacted immediately.

FIG. 5 thus illustrates a flowchart describing the operation of various environments (e.g., environment 100 described with reference to FIG. 1), systems (e.g., signature authentication system 102 described with reference to FIG. 1, system 300 described with reference to FIG. 3, system 400 described with reference to FIG. 4), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus (e.g., an embedded chip device) to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 5 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

Use Cases

Having described example embodiments in general terms, the following example embodiments are provided to further illustrate a use case of some example embodiments. In some instances, the following example embodiments provide examples of how the signature authentication system disclosed herein may authenticate handwriting on a paper-based document. Further, the embodiments disclosed herein may be extended to multiple use cases, such as mortgage documents, loan documents, power of attorney documents, and other documents.

"Check" Use Case

"Check" is an illustrative example use case wherein the signature authentication system disclosed herein may authenticate writings and signatures on a check that includes an embedded chip device and automatically transfer, in real-time, the check value to the payee without additional user input. First, a payer may write a payee name, date, amount, and comments (e.g., notes, memos) on the surface of a check and sign the check. The signature device may generate writing information indicative of the writings provided by the payer on the check. The signature device may further generate signature information indicative of the signature provided by the payer on the check.

The signature device may also receive document identification information for the check from the check's embedded chip device. For example, the check's embedded chip device may store document identification information comprising a check number; an account number (e.g., a checking account number, a savings account number); a routing number; financial institution information (e.g., name, address, phone number, website); logos or icons; a date of the check; a value (e.g., currency amount) of the check in numerical format; a value of the check in word format; a memo or note; personal information (e.g., name, address, phone number, email address, unique IDs (e.g., social security number (SSN), taxpayer identification number (TIN), employer identification number (EIN), financial institution member number)) and other information about the payer (i.e., the account owner, the person writing the check) and the payee (i.e., the person or entity to whom the check is payable); or any combination thereof.

The signature device may encrypt the document identification information, the signature information, and the writing information and transmit the encrypted information to an authentication server device associated with the payer's financial institution. The authentication server may decrypt and analyze the document identification information, the signature information, and the writing information and generate authentication information based on the document identification information, the signature information, and the writing information. The authentication information may indicate that the check has been validated by the payee's financial institution. In some instances, the authentication information may be an electronic token.

The authentication server device may transmit the authentication information back to the signature device, which may in turn transfer the authentication information to the check's embedded chip device. As a result, the check will include the traditional writings and signature of the payer as well as an electronic confirmation of the check's authenticity in the form of a confirmation from the payee's financial institution stored in the check's embedded chip device. The recipient of the check (i.e., the payee) can then simply use their financial institution's mobile wallet (e.g., a mobile wallet app executing on the recipient's smartphone) and deposit the check in their bank account. The check value will be transferred instantly because the signature is already verified and validated. Accordingly, there is no need for the payee to take pictures of the front and back of the check in order to deposit the check in the payee's account. Rather, as the check comes in close proximity to the payee's mobile wallet, the mobile wallet picks up the check and prompts the user whether or not to deposit the check.

In some embodiments, the signature device may transfer the signature information and the writing information to the embedded chip device, which may add that information to the document identification information. For example, in addition to the authentication information, the signature device may transmit the signature information (e.g., the signature handwritten by the user on the check) and the writing information (e.g., the date, payee name, check amount in numerical format, check amount in word format, and memo or note handwritten by the user on the check) to the embedded chip device, which may add that information to the document identification information or otherwise store that information in association with the document identification information.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. An apparatus, comprising:
   a processor; and
   memory storing instructions that, when executed by the processor, cause the processor to:
   capture, in real-time and using a set of one or more electronic devices, a paper-based handwriting on a paper-based document;
   concurrent with capturing the paper-based handwriting, produce an electronic version of the paper-based handwriting using the set of one or more electronic devices;
   verify authenticity of the electronic version of the paper-based handwriting, wherein the verification comprises comparing the electronic version of the paper-based handwriting to an authentic paper-based handwriting associated with a user; and
   in response to verifying the authenticity of the electronic version of the paper-based handwriting:
     generate authentication metadata based on the electronic version of the paper-based handwriting,
     associate the electronic version of the paper-based handwriting with an electronic version of the paper-based document,
     cryptographically encrypt the authentication metadata, the electronic version of the paper-based handwriting, and the paper-based document, and
     store the encrypted authentication metadata, the encrypted electronic version of the paper-based handwriting, and the encrypted paper-based document.

2. The apparatus of claim 1, wherein the memory further stores instructions that, when executed by the processor, cause the processor to automatically transfer a value or a right associated with the paper-based document based at least in part on verification of the authenticity of the electronic version of the paper-based handwriting.

3. The apparatus of claim 1, wherein the memory further stores instructions that, when executed by the processor, cause the processor to encrypt at least a portion of the electronic version of the paper-based handwriting.

4. The apparatus of claim 1, wherein the memory further stores instructions that, when executed by the processor, cause the processor to compare the electronic version of the paper-based handwriting to previously provided authentic signature information to verify the authenticity of the electronic version of the paper-based handwriting.

5. The apparatus of claim 1, wherein the paper-based document comprises one or more of a negotiable instrument, a mortgage document, a loan document, a lien document, a lease document, a security agreement, a title document, a deed, and a check.

6. The apparatus of claim 1, wherein the paper-based handwriting comprises a signature.

7. The apparatus of claim 6, wherein the memory further stores instructions that, when executed by the processor, cause the processor to encode a cryptographic representation of the signature along with metadata.

8. The apparatus of claim 7, wherein the metadata includes one or more of a timestamp, a location, and biometric information.

9. The apparatus of claim 1, wherein the paper-based handwriting comprises a signature and at least one of a recipient date, a value, a comment, and an alteration.

10. At least one non-transitory computer-readable storage medium storing computer-executable program instructions that, when executed, cause a computing device to:
    capture, in real-time and using a set of one or more electronic devices, a paper-based handwriting on a paper-based document;

concurrent with capturing the paper-based handwriting, produce an electronic version of the paper-based handwriting using the set of one or more electronic devices;

verify authenticity of the electronic version of the paper-based handwriting, wherein the verification comprises comparing the electronic version of the paper-based handwriting to an authentic paper-based handwriting associated with a user; and in response to verifying the authenticity of the electronic version of the paper-based handwriting:

generate authentication metadata based on the electronic version of the paper-based handwriting, associate the electronic version of the paper-based handwriting with an electronic version of the paper-based document, cryptographically encrypt the authentication metadata, the electronic version of the paper-based handwriting, and the paper-based document, and store the encrypted authentication metadata, the encrypted electronic version of the paper-based handwriting, and the encrypted paper-based document.

11. The at least one non-transitory computer-readable storage medium of claim 10, wherein the computer-executable program instructions, when executed, further cause the computing device to automatically transfer a value or a right associated with the paper-based document based at least in part on verification of the authenticity of the electronic version of the paper-based handwriting.

12. The at least one non-transitory computer-readable storage medium of claim 10, wherein the computer-executable program instructions, when executed, further cause the computing device to encrypt at least a portion of the electronic version of the paper-based handwriting.

13. The at least one non-transitory computer-readable storage medium of claim 10, wherein the computer-executable program instructions, when executed, further cause the computing device to compare the electronic version of the paper-based handwriting to previously provided authentic signature information to verify the authenticity of the electronic version of the paper-based handwriting.

14. The at least one non-transitory computer-readable storage medium of claim 10, wherein the paper-based handwriting comprises a signature and the computer-executable program instructions, when executed, further cause the computing device to encode a cryptographic representation of the signature along with metadata.

15. The at least one non-transitory computer-readable storage medium of claim 14, wherein the metadata includes one or more of a timestamp, a location, and biometric information.

16. A computer-implemented method, comprising:

capturing, in real-time and using a set of one or more electronic devices, a paper-based handwriting on a paper-based document:

concurrent with capturing the paper-based handwriting, produce an electronic version of the paper-based handwriting using the set of one or more electronic devices;

verifying authenticity of the electronic version of the paper-based handwriting, wherein the verification comprises comparing the electronic version of the paper-based handwriting to an authentic paper-based handwriting associated with a user; and in response to verifying the authenticity of the electronic version of the paper-based handwriting:

generating authentication metadata based on the electronic version of the paper-based handwriting, associating the electronic version of the paper-based handwriting with an electronic version of the paper-based document, cryptographically encrypting the authentication metadata, the electronic version of the paper-based handwriting, and the paper-based document, and storing the encrypted authentication metadata, the encrypted electronic version of the paper-based handwriting, and the encrypted paper-based document.

17. The computer-implemented method of claim 16, further comprising automatically transferring a value or a right associated with the paper-based document based at least in part on verification of the authenticity of the electronic version of the paper-based handwriting.

18. The computer-implemented method of claim 16, further comprising encrypting at least a portion of the electronic version of the paper-based handwriting.

19. The computer-implemented method of claim 16, further comprising comparing the electronic version of the paper-based handwriting to previously provided authentic signature information to verify the authenticity of the electronic version of the paper-based handwriting.

20. The computer-implemented method of claim 16, wherein the paper-based handwriting comprises a signature and the method further comprises encoding a cryptographic representation of the signature along with metadata including one or more of a timestamp, a location, and biometric information.

* * * * *